United States Patent [19]

Chao et al.

[11] Patent Number: 5,305,451
[45] Date of Patent: Apr. 19, 1994

[54] SINGLE PHASE CLOCK DISTRIBUTION CIRCUIT FOR PROVIDING CLOCK SIGNALS TO MULTIPLE CHIP INTEGRATED CIRCUIT SYSTEMS

[75] Inventors: Hu H. Chao, Pleasantville, N.Y.; Jung H. Chang, Saratoga, Calif.; Feng-Hsien W. Shih, Yorktown Heights, N.Y.

[73] Assignee: International Business Machines Corporation, Armonk, N.Y.

[21] Appl. No.: 578,035

[22] Filed: Sep. 5, 1990

[51] Int. Cl.$^5$ ............... G06F 1/04; G06F 13/372; H03K 17/687
[52] U.S. Cl. .................... 395/550; 307/585; 365/233; 395/275
[58] Field of Search ........ 364/200; 307/585; 371/22.3; 395/275; 365/233

[56]  References Cited

U.S. PATENT DOCUMENTS

| | | | |
|---|---|---|---|
| 3,919,695 | 11/1975 | Gooding | 364/200 |
| 3,946,254 | 3/1976 | Millben | 307/542.1 |
| 4,063,308 | 12/1977 | Collins et al. | 364/200 |
| 4,164,629 | 8/1979 | Ollivier et al. | 370/105.1 |
| 4,409,680 | 10/1983 | Schnathorst et al. | 365/233 |
| 4,476,401 | 10/1984 | Lin | 307/585 |
| 4,503,490 | 3/1985 | Thompson | 365/233 |
| 4,575,794 | 3/1986 | Veneski et al. | 364/200 |
| 4,941,201 | 7/1990 | Davis | 455/41 |
| 5,045,801 | 9/1991 | Mowery | 307/475 |
| 5,068,603 | 11/1991 | Mahoney | 371/22.3 |
| 5,107,137 | 4/1992 | Kinugasa et al. | 307/481 |

FOREIGN PATENT DOCUMENTS

| | | |
|---|---|---|
| 0329418 | 8/1989 | European Pat. Off. . |
| 0337773 | 10/1989 | European Pat. Off. . |

OTHER PUBLICATIONS

"A Method to Obtain an Optimal Clocking Scheme for a Digital System" by James Beausang et al, 1985 IEEE.

*Primary Examiner*—Eugene R. LaRoche
*Assistant Examiner*—Michael C. Kessell
*Attorney, Agent, or Firm*—Pollock, Vande Sande & Priddy

[57]  ABSTRACT

A circuit to provide single phase clock signals having controlled clock skew to multiple integrated circuit chips is described. A source of single phase clock signals is supplied to a clock signal distribution tree of each integrated circuit. Phase comparison of signals produced by each clock distribution circuit tree provides a control signal for controlling the delay of a clock signal applied to a respective clock distribution tree. A gating circuit is disclosed which produces, in response to each clock signal produced by the clock distribution trees, an accurately controlled LOAD ENABLE and OUTPUT ENABLE signal.

5 Claims, 5 Drawing Sheets

GENERAL FORM FOR A DATA PATH

SINGLE PHASE CLOCK DISTRIBUTION CIRCUIT FOR PROVIDING CLOCK SIGNALS TO MULTIPLE CHIP INTEGRATED CIRCUIT SYSTEMS

The present invention relates to distributing synchronized clock signals to different chips of a multichip system. Specifically, a system is described for supplying in-phase clock signals from a common clock signal source for deriving gating control signals for multiple integrated circuit chips. Timing is controlled so that the LOAD ENABLE and OUTPUT ENABLE signals avoid the feedthrough problem from a master latch to the corresponding slave latch in a single phase clock system.

Computer system data functions and control functions are implemented by the use of basic circuit elements, such as a register. Each register receives and transfers a single bit of data to a subsequent register, wherein the data may be used as either a control function or manipulated as processed data. For many computer systems, the processing functions can be performed on a data stream by a series of combination blocks separated by registers which include L1 (master latches) and L2 (slave latches). A LOAD ENABLE signal allows the data to pass to the L1 latches from the input, i.e., transfer into a register, and the OUTPUT ENABLE signal allows the data to pass to the L2 latches from the L1 latches, i.e., transfer to the output of a register. LOAD ENABLE and OUTPUT ENABLE commands must be precisely timed in order to avoid data from being prematurely rippled through a given register. Rather than the normal sequence of loading the data during a clock cycle, followed by a clock cycle for reading out the data, the data merely ripples through.

Ripple within a register (e.g., though L1 latch and L2 latch of the same register) happens when the overlap of the rising edge of the LOAD ENABLE signal, e.g., LDCLK A, and the falling edge of the OUTPUT ENABLE signal, e.g., OECLK A, is longer than the propagation delay of the register. This problem can be avoided with the conventional two-phase non-overlap clock system. However, the implementation of the generation and distribution of a two-phase non-overlap clock is more costly and the clock skew, i.e., the timing skew of the clocking signals, caused by the device parameter variations and the power supply voltage variations, is greater as compared to that of the single phase clock. The present invention seeks to solve this ripple-through problem by using locally generated LOAD ENABLE and OUTPUT ENABLE signals from a single phase clock.

For a single phase clock system, the rising edge of the OUTPUT ENABLE signal, e.g., OECLK X, and the falling edge of the LOAD ENABLE signal, e.g., LDCLK X is overlapped. Ripple between registers (through the L2 latch of A register, any intermediate combination logic circuit block, and the L1 latch of B register) can happen when the overlap of the rising edge of the OUTPUT ENABLE signal of A register (OECLK A) and the falling edge of the LOAD ENABLE signal of B register (LDCLK B) is longer than the propagation delay of the registers and the combination logic block. Therefore, the design of the combination logic has to satisfy a minimum delay requirement to ensure that the delay of the registers and the combination logic block is longer than the clock skew. The minimum delay requirement normally can be satisfied by selectively adding logic levels to the minimum delay path of the combination logic blocks. Although it is usually easy to insert a few logic levels selectively to the minimum delay paths without impacting the density and/or maximum delay path, this can be difficult to achieve if the insertion of a large number of logic levels is required. Therefore, a single phase clock implementation is only practical if the clock skew can be kept small.

To minimize the clock skew, the clock distribution design normally provides matched path lengths and device delays. However, clock skew can not be eliminated due to the device parameter variations and the power supply voltage variations. The intrachip clock skew is normally quite small, e.g., smaller than 5% of the cycle time, due to on-chip device parameters tracking provided by the state-of-the-art integrated circuit technology. However, the clock skew between different chips is still very difficult to control due to the large device parameter variations from chip to chip. Since the A register and the B register can be far apart on a chip or even on different chips, the clock skew can be quite large, using conventional implementation. Therefore, improvement of the conventional implementation is required.

One approach to solving the problem of intrachip clock skew is described in U.S. Pat. No. 4,063,308. This reference describes an automatic delay means placed in each clock signal path for a chip. Delayed clock pulses in the clock signal paths are compared with a reference clock signal. A resulting detected error is used to control the automatic delay means for each chip to provide for a clock signal delay adjustment, thereby bringing the clock signals into time synchronization alignment with the referenced signal. This technique is implemented using a feedback signal driver to supply a signal proportional to the time difference between the compared reference signal and clock signal. The feedback signals to the automatic delay means are themselves a source of clock skew. The implementation is also very complicated and costly. The present invention seeks to improve upon the control over clock skew represented by the prior art distribution systems.

SUMMARY OF THE INVENTION

It is an object of this invention to provide a clocked LOAD ENABLE signal and a clocked OUTPUT ENABLE signal generated from a single phase clock signal for a plurality of register cells on a local area of an integrated circuit chip which avoids a condition of data ripple through the first and second latches of each register cell.

It is yet another objective of this invention to provide a clock signal distribution circuit which reduces the clock skew between clock signals of the single phase clock which are generated from a common clock signal and distributed to multiple integrated circuit chips.

In a first aspect of the invention, a circuit is provided to generate a LOAD ENABLE signal from a single phase clock signal. The design of the circuit ensures that there is no overlap between the rising edge of the LOAD ENABLE signal and the falling edge of the OUTPUT ENABLE signal of a register. The circuit is designed such that the rising edge of the LOAD ENABLE signal is one inverter delay later than the falling edge of the OUTPUT ENABLE signal. By limiting the registers to be controlled to a local area of an integrated circuit chip, the capacitance loading of the OUTPUT ENABLE and the LOAD ENABLE signals can be controlled such that only a few levels of logic circuits are required to generate these signals from the single phase clock signal. Therefore, by placing those circuits next to each other, the clock skew for the worst case device parameter variations and power supply voltage variations can be easily designed to be smaller than the inverter delay, because the variations are normally very small for circuits next to each other, and there are only a few levels of logic circuits involved.

In a second aspect of the invention, a clock distribution tree circuit is provided on each integrated circuit chip. The clock distribution tree is connected at an input side to a common source of clock signals for all the integrated circuit chips. The distribution trees associated with each integrated circuit chip are symmetrical and have substantially the same clock signal delay. Each clock distribution tree for each chip is matched by closely controlling the path length as well as device delay of the devices making up the clock distribution tree.

The common clock signal is applied to each of the inputs of the clock distribution tree circuit. Control over the delay of the clock signal applied to each input of the clock distribution tree permits the output signal from the clock distribution tree to be compared, and an error signal derived, to either lengthen or shorten the effective path length for the individual clock distribution trees. A phase detector provided on an integrated circuit chip compares the output clock signals of an adjacent clock circuit distribution tree with its own output clock signal, and controls the delay circuit in response to the comparison. The resulting phase comparison controls the delay circuit so that the two clock signals are brought into phase alignment.

DESCRIPTION OF THE PREFERRED EMBODIMENT

Figure 1:
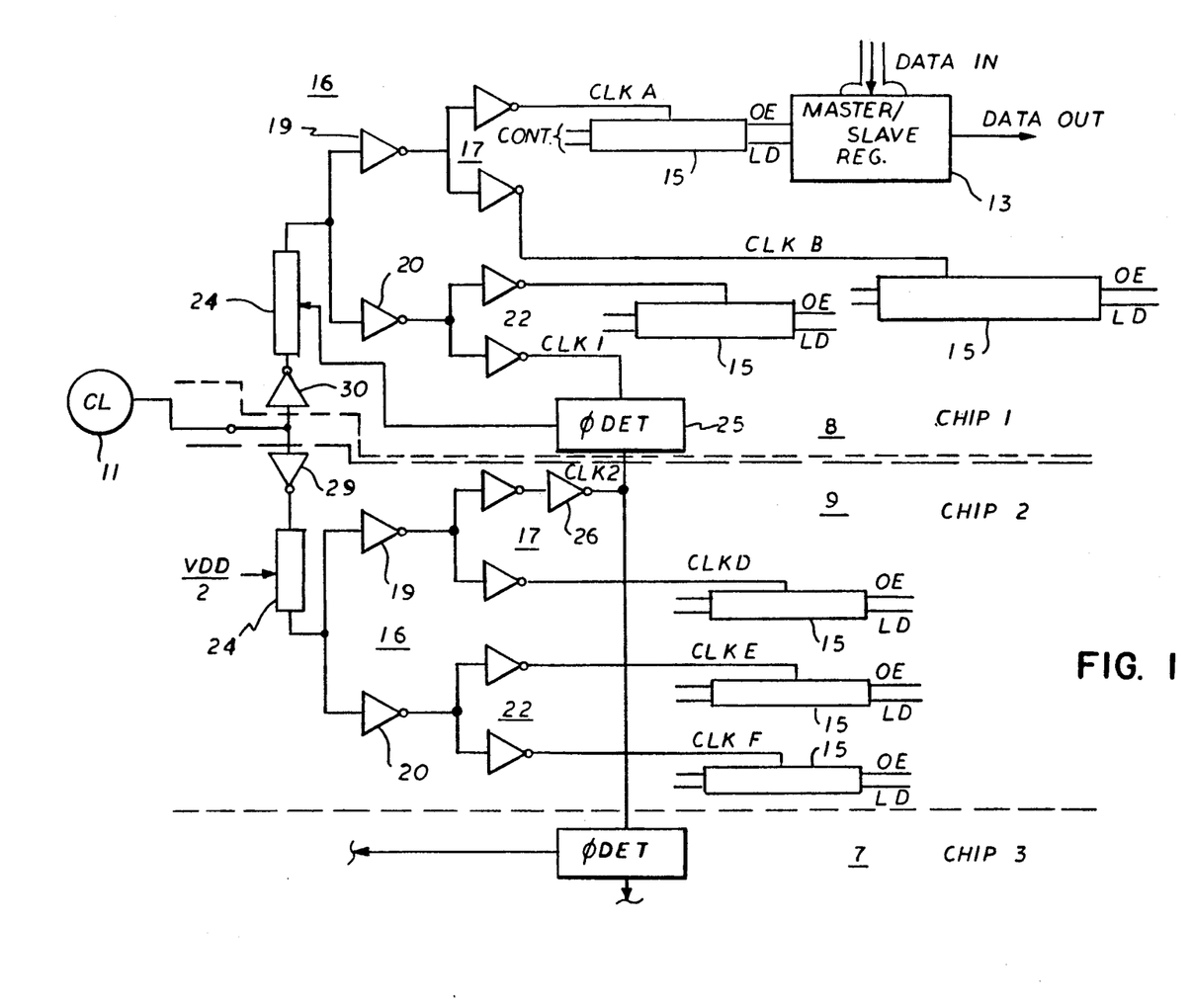
FIG. 1 illustrates two integrated circuit chips receiving a common single phase clock signal for gating respective registers on each integrated circuit chip.

FIG. 1 illustrates the implementation of a preferred embodiment of the invention which accurately controls the timing of a plurality of clocking signals derived from a common clock source. Sections 8 and 9 illustrate the clock signal distribution circuits for two individual integrated circuit chips. These clock signal distribution circuits include a clock distribution tree 16 which distributes clock signals to a plurality of gating circuits 15 for each of the integrated circuit chips represented by sections 8 and 9. The clock signals applied to the gating circuits 15 are derived from a pair of inverter circuits 17 and 22. The inverter circuits 17, 22 are, in turn, fed by individual driver inverter circuits 19 and 20. A common clock signal applied to driver inverter circuits 19 and 20 is distributed via additional pairs of inverter circuits 17 and 22, so as to derive four separate clock signals. It is possible to implement more than two pairs of output inverter circuits 17 and 22 to derive even more clock signals for distribution to additional gating circuits 15.

Each of the gating circuits 15 produces a LOAD ENABLE and OUTPUT ENABLE signal, clocked in synchronism with the applied clock signals, clock A through clock F. The clock signals A-F gate the control signals applied to each of the gating circuits 15 in time synchronism.

Each of the clock distribution trees 16 for each integrated circuit chip 8 and 9 is configured to have the same path length delay, as well as the same device delay. The intrachip delay may be controlled quite precisely since the tracking of devices on the same chip is very good.

Each of the clock distribution trees 16 is fed by a clock driver circuit 29 and 30, connected to a common clock signal source 11. A delay circuit 24 is implemented in the input signal path for the clock distribution tree 16 of integrated circuit chip 8. Using the delay circuit 24, and a signal derived from phase detector 25, it is possible to align the phase of the signals produced by inverter pairs 17 and 22 with respect to an equivalent signal produced from inverter pairs 17 and 22 of an adjacent integrated circuit chip 9. The phase detector 25 produces a signal which may be used to control the delay circuit 24. The derived control signal will establish a signal delay through the clock tree circuit 16 of FIG. 1 so as to bring the respective clock signals produced by each clock tree circuit into phase alignment.

Using the foregoing technique, two adjacent integrated circuit chips may be fed with essentially the same clock signal, although each integrated circuit chip may have a clock tree not identical with each other, or device delays to the clock source 11, which is equivalent.

FIG. 1 also illustrates a delay circuit for controlling the clock signal produced by the integrated circuit chip 8. It is possible to have yet another integrated circuit chip 7 which, like 8, is also controlled with respect to a signal produced by the clock tree distribution circuit 16 of integrated circuit 9. In this way, three circuits can be shown to have tightly controlled clock signals. It is possible to extend this principle to multiple chips beyond the three demonstrated, such that a single clock source can provide a great number of clock signals to various integrated circuit chips, all having a tightly controlled phase alignment.

Figure 2:
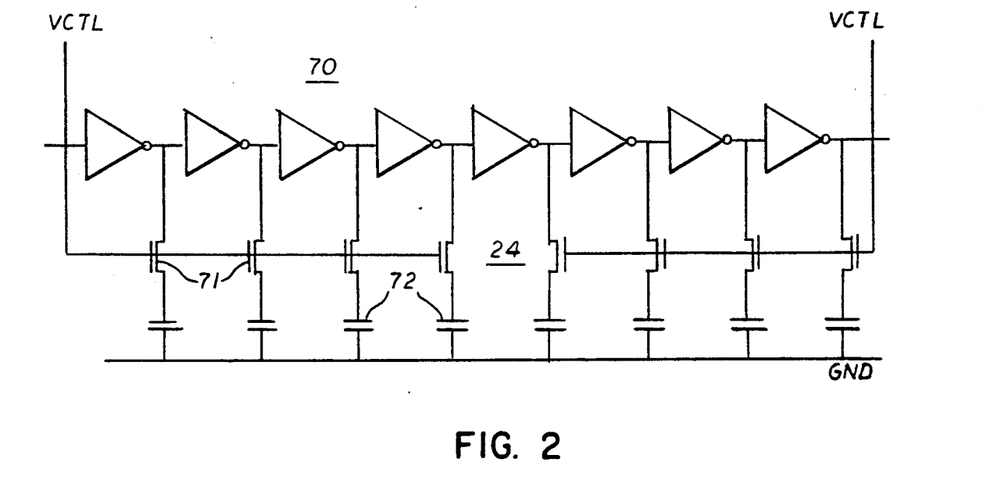
FIG. 2 illustrates a prior art voltage controlled phase delay circuit which may be implemented with the clock signal distribution trees of FIG. 2.

FIG. 2 is a commonly employed voltage controlled delay circuit which is controlled by a signal VCTL. The delay circuit comprises a plurality of inverters 70, connected in tandem which serve as delay elements. A plurality of gates 71 connect each of the output signals to a plurality of capacitors 72 connected to the common ground connection. The VCTL signal derived from the phase comparator 25 will gate the shunt gate 71 into conduction, and the on time of the shunt gate 71 will depend on the voltage of the VCTL signal. Thus, for the period of time defined by the voltage of the VCTL signal, the outputs for each of the delay circuits 70 are shunted to a capacitor 72 through an impedance defined by the gate 71.

Figure 3:
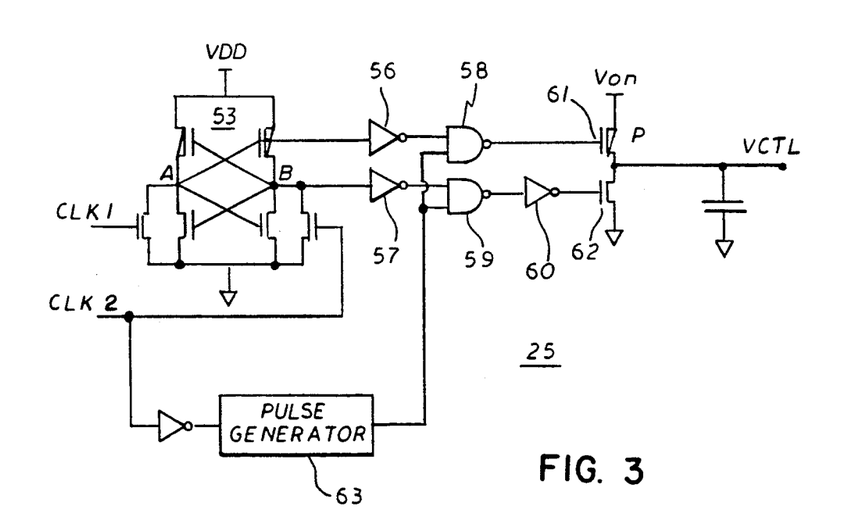
FIG. 3 illustrates a comparator circuit for comparing clock signals produced by each integrated circuit chip clock tree, and the generation of the control signal for the voltage controlled phase delay circuit of FIG. 2.

The phase detector is shown more particularly in FIG. 3. The phase detector includes a latch 53 which latches on logic 1 (i.e., nodes A high) when clock signal 1 arrives later than clock signal 2. An additional pulse generator 63 is shown which gates a clock 2 signal, with respect to one of the clocks, as applied to NAND gates 58 and 59. The pulse generator 63 constituting a monostable one-shot device, issues an enabling signal to NAND gates 58 and 59, precisely timed with respect to clock signal 2. The resulting output signals from NAND gates 58 and 59 are used to drive a pair of pull up and pull down FET devices 61 and 62, via an inverter 60. Thus, depending on whether the phase difference between clocks 1 and 2 is positive or negative, an output signal VCTL will be increased or decreased. As the signals clock 1 and clock 2 are driven into phase alignment, the voltage of VCTL tends to stabilize.

It is clear that the circuit of FIG. 1 can be implemented in CMOS technology using standard CMOS devices to configure each of the delays 24, phase detectors 25, gating circuit 15 and clock signal distribution tree 16 using conventional MOS devices.

Figure 4:
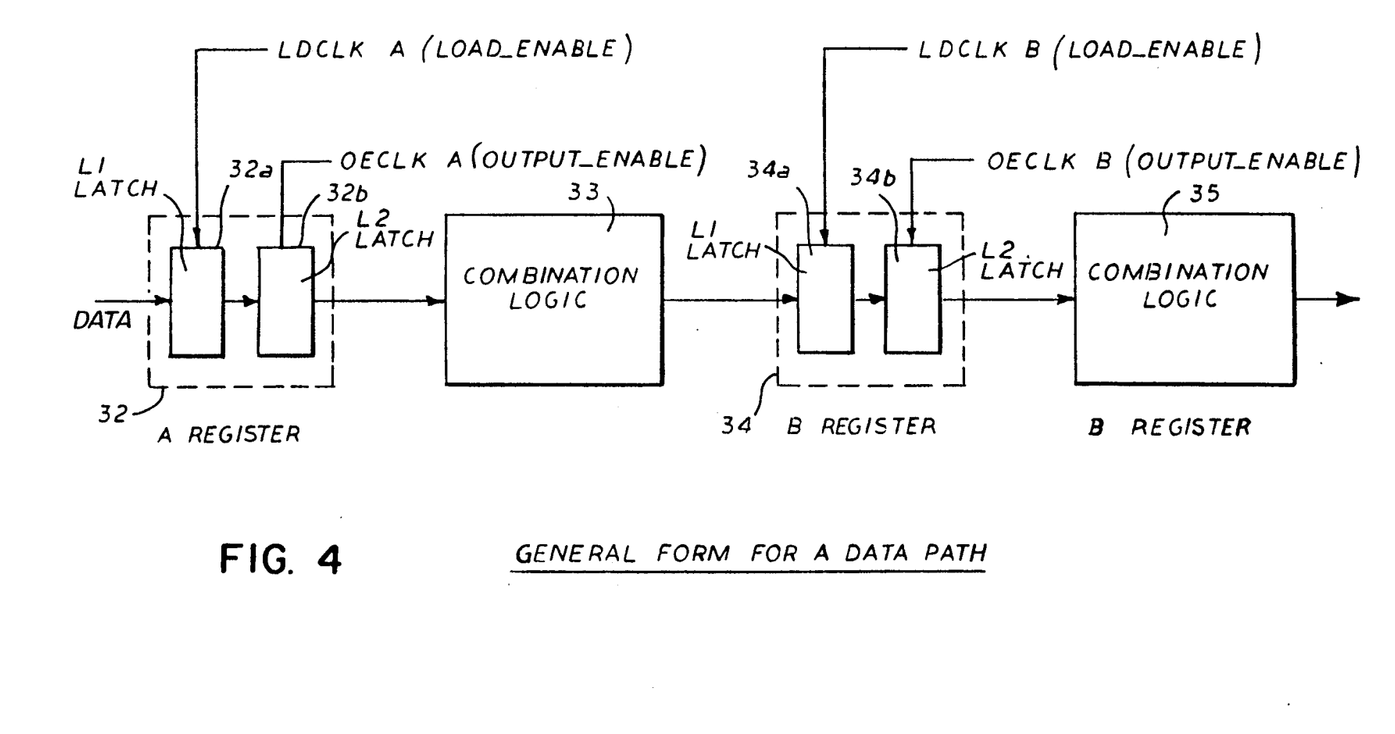
FIG. 4 illustrates a general block diagram of a data path.

Referring to FIG. 4, there is shown a series of combination blocks 33, 35 separated by registers 32, 34 which can perform processing functions on a data stream. The registers 32, 34 include latches L1 (32(a)) and L2 (32(b)), respectively serving as master and slave latches. When a LOAD ENABLE signal is applied to the L1 latch 32(a), data passes to the L1 latch 32(a) from the input. When the OUTPUT ENABLE signal is asserted, the data passes to the L2 latch 32(b) from the L1 latch 32(a), thus being transferred to the output side of the register 32. The LOAD ENABLE and OUTPUT ENABLE commands, as previously noted, must be precisely timed in order to avoid data from being prematurely rippled through a given register. In normal operation, the data is loaded during a first clock cycle and during a subsequent clock cycle read out. The ripple-through phenomena caused by the LOAD ENABLE and OUTPUT ENABLE signals results in the data being rippled through the latches 32(a) and 32(b).

Data which ripples through latches L1 and L2, 32(a) and 32(b), of the same register 32 occurs when the overlap of the rising edge of the LOAD ENABLE signal, shown as LDCLK A and the falling edge of the OUTPUT ENABLE signal OECLK A is longer than the propagation delay of the register.

Figure 6:
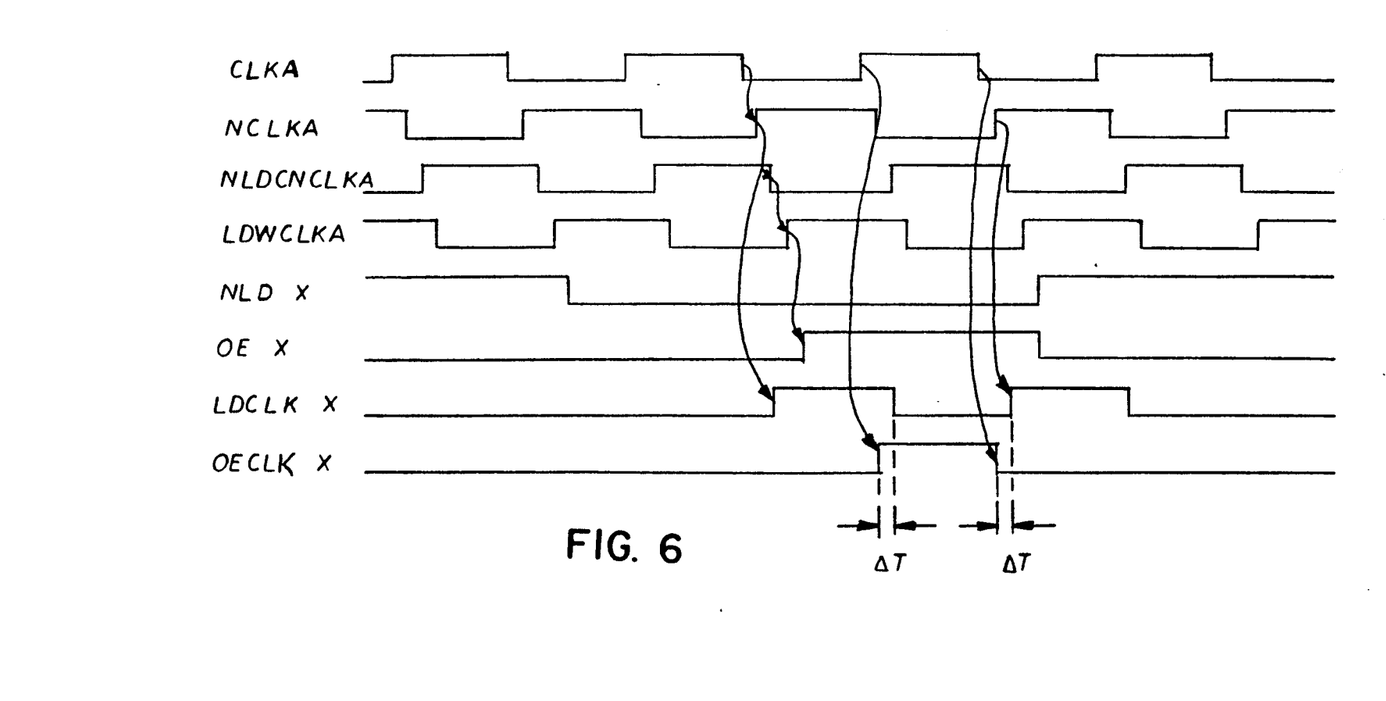
FIG. 6 illustrates the clock waveforms produced by the circuit of FIG. 5.

In a single phase clock system, as was previously noted, the rising edge of the OUTPUT ENABLE signal and the falling edge of the LOAD ENABLE signal is overlapped as shown in FIG. 6. If the overlap of the rising edge of the OUTPUT ENABLE signal of the A register 32 and the falling edge of the LOAD ENABLE signal of the B register 34 is longer than the propagation delay of the registers (32b and 34a) and the combination logic block 33, the data can ripple through the L2 latch 32(b) of register A 32, the combination circuit block 33, and the L1 latch 34a of register B 34. Thus, the solution to the ripplethrough problem is obtained by accurately controlling the delay between the rising edge of the OUTPUT ENABLE signal and the falling edge of the LOAD ENABLE signal.

Figure 5:
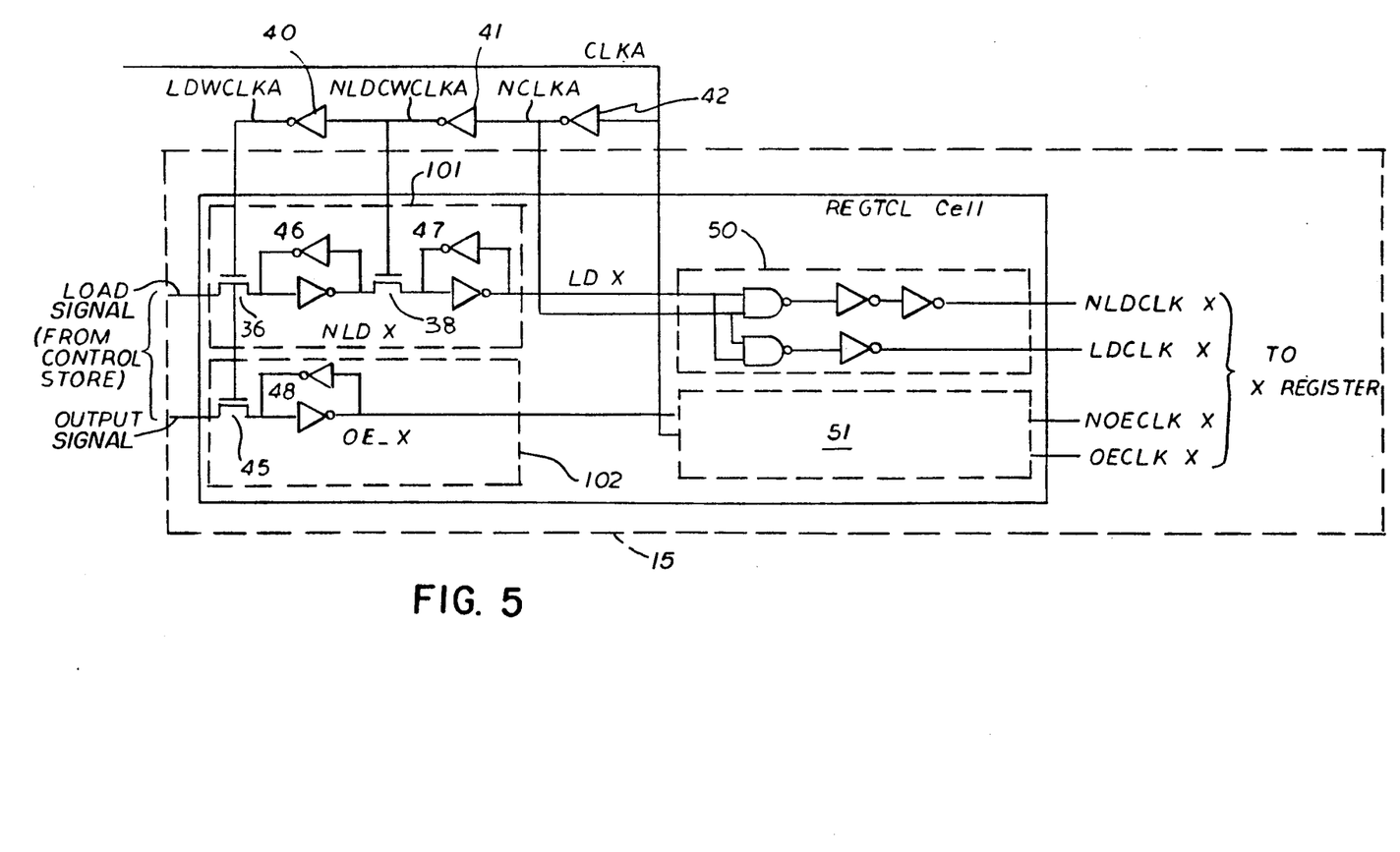
FIG. 5 illustrates the clocking circuit for producing a LOAD ENABLE gating signal and OUTPUT ENABLE gating signal for each register on a local area of an integrated circuit chip.

FIG. 5 illustrates a gating circuit 15 which may be implemented to generate LOAD ENABLE and OUTPUT ENABLE control signals, which avoids the condition of ripplethrough within the same register. Shown in FIG. 5 is a circuit which derives from one of the clock signals, illustrated as CLKA, required gating signals to generate LOAD ENABLE and OUTPUT ENABLE signals for each register on a local area of an integrated circuit chip. The LOAD ENABLE and OUTPUT ENABLE signals as modified and outputted comprise a pair of true and complementary signals: (1) LDCLK; NLDCLK; (2) OECLK; NOECLK.

The LOAD and OUTPUT signals which are derived from a control store from the computer are not precisely aligned, but are latched into the control registers (master-slave register 101 and single-level register 102) under control of LDCWCLKA and NLDCWCLKA which are generated from the single phase clock signal CLKA. Master slave register 101 includes two gates 36 and 38 interconnected by two pairs of inverters 46, 47. The single level register includes a signal gate 45 connected to a pair of inverters 40. The rising edge of LDCWCLKA (the LOAD ENABLE signal for register 101) is delayed from the falling edge of NLDCWCLKA (the OUTPUT ENABLE signal for register 101) to prevent the LOAD signal from rippling through the register 101. LD X has to be stable while NCLKA is high and OE X has to be stable while CLKA is high for providing stable output signals LDCLK X, NLDCLK X, OECLK X and NOECLK X. To insure this, NLDCWCLKA (the OUTPUT ENABLE signal for the control register 101) has to be out of phase with NCLKA so that the rising edge of NLDCWCLKA is not overlapped with the falling edge of NCLKA, and LDCWCLKA has to be out of phase with CLKA so that the rising edge of LDCWCLKA is not overlapped with the falling edge of CLKA, as shown in FIG. 6. It has been found that the inverter circuits 40, 41 and 42 in FIG. 5 provide a controllable delay which is sufficient to guarantee that these requirements can be satisfied even at the worst case process parameters variation and power supply voltage variation. Similarly, the rising edge of LDCLK X is one inverter delay later than the falling edge of OECLK X. And the delay of that inverter 42 is sufficient to guarantee that the rising edge of LDCLK X (the LOAD ENABLE signal for X register) is later than the falling edge of OECLK X (the OUTPUT ENABLE signal for X register).

The reason that this can be achieved is that the number of registers controlled by LDCLK X and OECLK X is normally not large. Therefore, only a few levels of logic circuits are required to generate these signals from CLKA which is the single phase clock signal. By placing those circuits next to each other, the clock skew for the worst case device parameters variation and power supply voltage variation can easily be designed to be smaller than the inverter delay because the variations are normally very small for circuits next to each other, and there are only a few levels of logic circuits involved.

The true and complement clocks, LDCLK and NLDCLK, respectively, are needed for a transmission gate and can be designed to track each other. For a pass gate, only a true clock is needed.

The $\Delta T$ in FIG. 6, representing the clock timing difference between LOAD ENABLE and OUTPUT ENABLE gating signals produced by circuit 15, is about 0.35 NS for a 1 micrometer CMOS implementation. This $\Delta T$ is sufficient to guard against feedthrough within a register. Feedthrough between registers is avoided using only a minimum delay requirement on a very short signal path.

FIG. 6 illustrates the respective timing derived for the circuit of FIG. 5. It is clear that CLKA and NCLKA signals are closely defined, and have a delay which is in direct proportion to the delay of device 42. From these delayed clock pulses, the respective clocking pulses for the gates 36, 38 and 45 are derived. These clocking pulses have a timing difference accurately controlled, and set to the inverter device delays 40 and 41.

The resulting LDCLK X and OECLK X signals produced from the register logic cells 50 and 51 have the required delay to prevent the ripple-through from occurring on the connected master slave latches of a connected register X.

Thus, there is described with respect to one embodiment, a device for controlling clock skew in multichip integrated circuits. Those skilled in the art will recognize yet other embodiments defined more particularly by the claims which follow.

We claim:

1. A circuit for providing from a command clock signal a clocked LOAD ENABLE, and OUTPUT ENABLE signal all having a predetermined time difference comprising:
   first, second and third serially connected inverter circuits for generating from said clock signal first, second and third delayed clock signals;
   first and second gate transistors serially connected together by a first pair of parallel connected inverter circuits, said first gate transistor connected to pass a LOAD signal in response to said third delayed clock signal, said second gate transistor being enabled in response to said second delayed signal;
   a third gate transistor connected to pass an OUTPUT signal in response to said third delayed clock signal; and,
   a register cell for generating complementary LOAD and ENABLE signals from said first delayed clock signal and said LOAD signal from said second gate transistor, and for generating complementary OUTPUT ENABLE signals from said command clock and said OUTPUT signal from said third gate transistor.

2. The circuit of claim 1 wherein said register cell receives said LOAD signal from said second gate transistor through a second pair of parallel connected inverters, and receives said OUTPUT signal from said third gate transistor through a third pair of parallel connected inverters.

3. A circuit for providing a clocked LOAD ENABLE signal and OUTPUT ENABLE signal having a predetermined time difference to first and second register cells comprising:
   a clock distribution circuit for providing a common clock signal for different circuits of an integrated circuit chip;
   first, second and third inverter circuits connected to receive said common clock signal and providing, respectively, first, second and third delayed clock signals;
   a master slave register for receiving a LOAD control signal, and providing a LOAD ENABLE signal to said first register logic cell in response to delayed clock signals from said first and second inverter circuits, said first register logic cell being clocked by said third delayed clock signal from said third inverter circuit; and,
   a single level register for receiving an OUTPUT CONTROL signal, and passing an OUTPUT ENABLE signal to said second register logic cell in response to said first delayed clock signal from said first inverter circuit, said second register lock cell being clocked by said clock signal from said distribution circuit.

4. The circuit of claim 3 wherein said master slave register comprises first and second pairs of parallel connected inverter circuits, serially connected together by a first gate transistor, and connected to receive said LOAD control signal through a second gate transistor, said gate transistor having gate connections connected to said first and second inverter circuits.

5. The circuit of claim 3, wherein said single level register comprises a gate transistor connected in series with a pair of parallel connected inverters, a gate connection of said gate transistor being connected to said first inverter to receive said first delayed clock signal.

* * * * *

UNITED STATES PATENT AND TRADEMARK OFFICE
CERTIFICATE OF CORRECTION

PATENT NO.   :   5,305,451
DATED        :   April 19, 1994
INVENTOR(S)  :   Chao et al It is certified that error appears in the above-identified patent and that said Letters Patent is hereby corrected as shown below:

In column 5, line 4, change "I" to --1--.

In column 8, line 43, after "inverter" insert --circuit--.

Signed and Sealed this

Fourth Day of October, 1994

Attest:

BRUCE LEHMAN

*Attesting Officer*  *Commissioner of Patents and Trademarks*